United States Patent
Xia et al.

(10) Patent No.: US 10,601,037 B2
(45) Date of Patent: Mar. 24, 2020

(54) LITHIUM-RICH NICKEL-MANGANESE-COBALT CATHODE POWDERS FOR LITHIUM-ION BATTERIES

(71) Applicants: Umicore, Brussels (BE); Umicore Korea Ltd., Chungnam (KR)

(72) Inventors: Xin Xia, Cheonan (KR); Song-Yi Han, Daejeon (KR); Ji-Hye Kim, Cheonan (KR); Jens Paulsen, Daejeon (KR)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 0 days.

(21) Appl. No.: 15/761,450

(22) PCT Filed: Sep. 22, 2016

(86) PCT No.: PCT/IB2016/055652
§ 371 (c)(1),
(2) Date: Mar. 20, 2018

(87) PCT Pub. No.: WO2017/051338
PCT Pub. Date: Mar. 30, 2017

(65) Prior Publication Data
US 2019/0051899 A1 Feb. 14, 2019

(30) Foreign Application Priority Data
Sep. 23, 2015 (EP) ..................................... 15186502

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/50* (2013.01); *C04B 35/016* (2013.01); *C04B 35/64* (2013.01);
(Continued)

(58) Field of Classification Search
CPC .. H01M 4/366; H01M 4/0416; H01M 4/0471; H01M 4/1391; H01M 10/0525;
(Continued)

(56) References Cited

U.S. PATENT DOCUMENTS

2002/0114995 A1* 8/2002 Thackeray ........... C01G 23/002
429/224
2007/0212607 A1 9/2007 Fujihara et al.
(Continued)

FOREIGN PATENT DOCUMENTS

EP 2557068A1 A1 2/2013
EP 2654109A1 A1 10/2013
(Continued)

OTHER PUBLICATIONS

International Search Report for PCT/IB2016/055652, dated Jan. 6, 2017.
(Continued)

*Primary Examiner* — Khanh T Nguyen
(74) *Attorney, Agent, or Firm* — NK Patent Law

(57) ABSTRACT

The invention provides a dual component lithium-rich layered oxide positive electrode material for a secondary battery, the material consisting of a single-phase lithium metal oxide with space group R-3m and having the general formula $Li_{1+b}N_{1-b}O_2$, wherein $0.155 \leq b \leq 0.25$ and $N=Ni_xMn_yCo_zZr_cA_d$, with $0.10 \leq x \leq 0.40$, $0.30 \leq y \leq 0.80$, $0 < z \leq 0.20$, $0.005 \leq c \leq 0.03$, and $0 \leq d \leq 0.10$, and wherein x+y+
(Continued)

Figure 1:
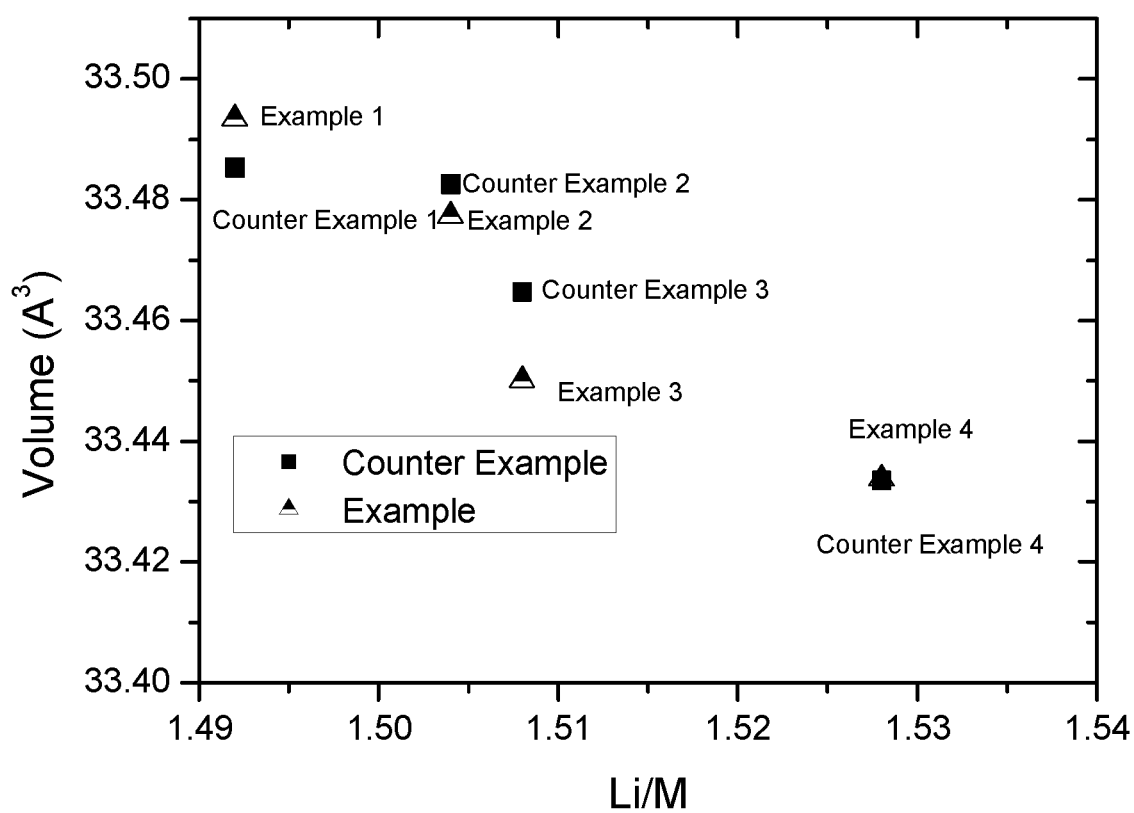

z+c+d=1, with A being a dopant comprising at least one element, and the material further consisting of a $Li_2ZrO_3$ component.

13 Claims, 2 Drawing Sheets

(51) Int. Cl.
    *C01G 53/00*     (2006.01)
    *C04B 35/01*     (2006.01)
    *C04B 35/64*     (2006.01)
    *H01M 10/0525*     (2010.01)
    *H01M 4/02*     (2006.01)

(52) U.S. Cl.
    CPC ......... *H01M 4/525* (2013.01); *C01P 2002/50* (2013.01); *C01P 2002/52* (2013.01); *C01P 2002/76* (2013.01); *C01P 2002/85* (2013.01); *C01P 2004/03* (2013.01); *C01P 2004/51* (2013.01); *C01P 2004/61* (2013.01); *C01P 2006/40* (2013.01); *C04B 2235/3244* (2013.01); *C04B 2235/3268* (2013.01); *C04B 2235/3275* (2013.01); *C04B 2235/3279* (2013.01); *C04B 2235/5409* (2013.01); *C04B 2235/5445* (2013.01); *C04B 2235/656* (2013.01); *C04B 2235/76* (2013.01); *C04B 2235/96* (2013.01); *H01M 10/0525* (2013.01); *H01M 2004/028* (2013.01)

(58) Field of Classification Search
    CPC ........ H01M 4/131; H01M 4/485; H01M 4/13; H01M 4/48; H01M 4/505; C01G 23/002
    USPC ........... 252/182.1; 429/231.1, 221, 207, 224, 429/211, 218.1
    See application file for complete search history.

(56) References Cited

U.S. PATENT DOCUMENTS

| | | | |
|---|---|---|---|
| 2011/0111298 A1* | 5/2011 | Lopez | H01M 4/131 429/221 |
| 2011/0123865 A1* | 5/2011 | Kepler | C03C 3/14 429/220 |
| 2011/0217592 A1* | 9/2011 | Gunji | H01M 4/48 429/218.1 |
| 2011/0244331 A1* | 10/2011 | Karthikeyan | C01G 51/50 429/223 |
| 2013/0015396 A1 | 1/2013 | Terashima | |
| 2013/0089787 A1 | 4/2013 | Nagai | |
| 2013/0101900 A1 | 4/2013 | Nagai | |
| 2013/0136985 A1 | 5/2013 | Fujiki et al. | |
| 2013/0136993 A1* | 5/2013 | Nakano | H01M 4/505 429/224 |
| 2013/0277604 A1 | 10/2013 | Shimokita | |
| 2013/0288121 A1* | 10/2013 | Nagai | H01M 4/13 429/211 |
| 2014/0054495 A1 | 2/2014 | Paulsen et al. | |
| 2014/0141325 A1* | 5/2014 | Yu | H01M 4/485 429/207 |
| 2014/0287312 A1* | 9/2014 | Choi | H01M 4/485 429/223 |
| 2015/0024273 A1 | 1/2015 | Yamazaki et al. | |

FOREIGN PATENT DOCUMENTS

| | | | | |
|---|---|---|---|---|
| EP | 2826750A1 A1 | 1/2015 | | |
| JP | 2007273448 A | 10/2007 | | |
| JP | 2013114786 A | 6/2013 | | |
| JP | 2013134871 A | 7/2013 | | |
| JP | 2013193888 A | 9/2013 | | |
| JP | 2013239434 A | 11/2013 | | |
| JP | 2014-049309 A | * | 3/2014 | ............ C01G 25/00 |
| JP | 2014049309 A | 3/2014 | | |
| JP | 2014049309 A2 | 3/2014 | | |
| JP | 5459565 B1 | 4/2014 | | |
| JP | 5459565 B2 | 4/2014 | | |
| JP | 2014509046 A | 4/2014 | | |
| TW | 200941804 A | 10/2009 | | |
| TW | 201414064 A | 4/2014 | | |
| WO | 2011114534 A1 | 6/2013 | | |
| WO | 2015033246 A2 | 3/2015 | | |
| WO | 2015040818 A1 | 3/2015 | | |
| WO | 2015121574 A1 | 8/2015 | | |
| WO | 2015132647 A1 | 9/2015 | | |

OTHER PUBLICATIONS

EPO, Search Report for European Patent Application No. 15186502, dated Dec. 21, 2015.

TIPO, Search Report for Taiwanese Patent Application No. 105130861, dated Mar. 28, 2017.

Ira Bloom et al., "Effect of Interface Modifications on Voltage Fade in 0.5Li2MnO3-0.5LiNi0.375Mn0.375Co0.25O2 Cathode Materials, Journal of Power Sources", 2014, pp. 509-514, vol. 249.

Eungje Lee et al., "Aluminum and Gallium Substitution Into 0.5Li2MnO3-0.5Li(Ni0.375Mn0.375Co0.25)O2 Layered Composite and the Voltage Fade Effect", Journal of the Electrochemical Society, pp. A322-A329, 2015, vol. 162, No. 3.

* cited by examiner

LITHIUM-RICH NICKEL-MANGANESE-COBALT CATHODE POWDERS FOR LITHIUM-ION BATTERIES

This application is a National Stage application of International Application No. PCT/IB2016/055652, filed Sep. 22, 2016. This application also claims priority to European Application No. EP15186502.9, filed Sep. 23, 2015.

TECHNICAL FIELD AND BACKGROUND

This invention relates to improved Lithium-rich Nickel-Manganese-Cobalt cathode materials for rechargeable lithium ion batteries. The cathode material with layered structure contains Ni, Mn, Co, is doped with metal elements and has a modified composition that shows improved cycle stability, especially an improved high voltage stability, when charged to 4.6 V in a coin-cell type test. High voltage stability is one of the most critical issues of Lithium-rich Nickel-Manganese-Cobalt cathode materials.

Commercially available lithium-ion batteries typically contain a graphite-based anode and cathode materials. A cathode material is usually a powderous material capable to reversibly intercalate and de-intercalate lithium. In the current industrial market, $LiCoO_2$ (so called "LCO"), $Li(Ni_xMn_yCo_z)O_2$ (so called "NMC", x+y+z=1), and $LiMn_2O_4$ (so called "LMO") are the dominating cathode materials for rechargeable lithium batteries. $LiCoO_2$ was first introduced as cathode materials for lithium-ion batteries in 1990 by Sony. Since then, it is the most widely used cathode material, especially after commercialization of high voltage LCO, it dominates the application for portable electronics, for example, smartphones and tablets. "NMC" was developed around 2000—to replace LCO—by substituting Co by Ni and Mn, due to high price of Co metal. "NMC" has a gravimetric energy density comparable to LCO, but a much smaller volumetric energy density due to its lower volumetric density. Nowadays, NMC is mainly applied for automotive applications, for example, electrical vehicles (EV) and hybrids (HEV). This is because NMC is much cheaper than LCO, and automotive applications require a smaller volumetric density than portable electronics. "LMO" materials has been developed since the middle of 1990s. LMO has a spinel structure which has "3D" diffusion path of Li-ions. It has been widely used in various applications, such as power tools, E-bikes, and as well as automotive application.

With the rapid development of lithium-ion battery technology and related applications, there is a continuous demand to increase the energy density of the cathode. One approach is to increase the specific capacity of cathode materials. In 2000, a new type $Li_a(Ni_xMn_yCo_z)O_2$ (x+y+z=1, and a>>1) was developed.

Compared to normal NMC, such material has more than one Li atom per molecule. It is usually called "lithium-rich NMC" or "Over-lithiated lithium transition metal oxide" (here we call it "lithium-rich NMC"). Lithium-rich NMC also has a layered structure. The structure is a solid solution of a layered structure with a space group of R3-m and with a certain amount of long-range Li ordering with a $\sqrt{3}a_{hex} \times 3c_{hex}$ superstructure in the transition-metal layer. Lithium-rich NMC has a very high $1^{st}$ charge capacity of more than 300 mAh/g with a large plateau in the voltage profile at about 4.5 V (vs. Li/Li$^+$). This plateau is thought to be related to the release of $O_2$. The normal reversible specific capacity is above 250 mAh/g when cycled between 2.0~4.6 V (vs. Li/Li$^+$), which is much higher than the usual NMC materials. Therefore, lithium-rich NMC is very promising for its high energy density, for various applications such as automotive and power tools.

However, there are several critical issues for lithium-rich NMC. Firstly, the requirements for compatible electrolyte systems for lithium-rich NMC are strict. As described above, when lithium-rich NMC is used as cathode material in a full cell it needs to be activated by charging to above 4.5 V (corresponding to 4.6 V vs. Li/Li$^+$) to obtain the high capacity above 300 mAh/g. Then it also needs a broad cycling range, usually 2~4.6 V (vs. Li/Li$^+$) to keep the reversible capacity around 250 mAh/g. Usually such a high voltage cannot be tolerated by the current electrolyte systems: the organic solvents in the electrolyte, which are mainly linear and cyclic carbonates, start to decompose at high voltages >4.5 V, and form side products, which negatively impact the cathode/electrolyte and anode/electrolyte interface. The side products deteriorate the electrochemical performance of the batteries and result in a strong fading of the capacity. Research on improving the stability of the electrolytes at high voltage>4.5 V is ongoing, including finding new solvents, inventing new salts and combining functional additives.

There are also other intrinsic drawbacks for lithium-rich NMC. There are wide studies that show that during cycling, the average discharge voltage of lithium-rich NMC is gradually decreasing. In J. Electrochem. Soc. 2014 161(3): A318-A325, Croy et al. studied the voltage fading mechanism of lithium-rich NMC. They also found that the voltage fading results from the migration of transition metals to the lithium layers, thereby changing the local structure and causing the decrease of the energy output.

There are many efforts to improve the voltage fading of lithium-rich NMC. In J. Electrochem. Soc. 2015 162(3): A322-A329, Lee et al. found there is no benefit for improving the voltage fading by Al and Ga doping. In another work done by Bloom at al. in J. Power. Sources 2014 249: 509-514, they confirmed that coating approaches, for example, $Al_2O_3$, $TiO_2$ and $AlPO_4$ coating on lithium-rich NMC, does not help to suppress the voltage fading.

In EP2654109A1, WO2015/040818, JP5459565B2 and EP2557068A1 overlithiated zirconium-doped nickel-manganese-cobalt oxides and their use as positive electrode materials for secondary batteries is disclosed. In EP2826750A1 and JP2014-049309 positive electrode materials comprising a zirconium-doped lithium nickel-cobalt-manganese oxide and a lithium zirconate compound that is formed on its surface are disclosed.

In view of the problems cited before, the search for effective approaches to improve the voltage stability of lithium-rich NMC during cycling becomes one of the most important topics for the future development and application of this type of cathode material. An object of the present invention is to provide solutions to suppress the voltage fading of lithium-rich NMC while keeping the high gravimetric energy density of the materials.

SUMMARY

Viewed from a first aspect, the invention can provide the following product embodiments:

Embodiment 1

A dual component lithium-rich layered oxide positive electrode material for a secondary battery, the material comprising a single-phase lithium metal oxide component, having the general formula $Li_{1+b}N_{1-b}O_2$, wherein $0.155 \leq b \leq 0.25$ and $N=Ni_xMn_yCo_zZr_cA_d$, wherein $0.10 \leq x \leq 0.40$, $0.30 \leq y \leq 0.80$, $0<z \leq 0.20$, $0.005 \leq c \leq 0.03$, $0 \leq d \leq 10.10$, and wherein $x+y+z+c+d=1$, with A being a dopant comprising at least one element, and the material further comprising a $Li_2ZrO_3$ component. In an embodiment $0.18 \leq b \leq 0.21$. In another embodiment, the material may consist only of the single-phase lithium metal oxide component and the secondary $Li_2ZrO_3$ component. In the material, the lithium may be stoichiometrically controlled with a molar ratio of $1.365 \leq Li/N \leq 1.515$. This lithium-rich NMC powder is a solid solution with layered structure with space group R3-m.

Embodiment 2

The dual component lithium-rich layered oxide positive electrode material wherein $0.205<b \leq 0.25$.

Embodiment 3

The dual component lithium-rich layered oxide positive electrode material, wherein $0.15 \leq x \leq 0.30$, $0.50 \leq y \leq 0.75$, $0.05<z \leq 0.15$, $0.01 \leq c \leq 0.03$, and $0 \leq d \leq 0.10$.

Embodiment 4

The dual component lithium metal oxide powder wherein the dopant A comprises either one or more elements selected from the group consisting of Al, Mg, Ti, Cr, V, W, Nb and Ru.

Embodiment 5

The dual component lithium-rich layered oxide positive electrode material wherein $0.205<b \leq 0.25$, and wherein the $Li_2ZrO_3$ component is homogeneously distributed in the layered oxide material.

Embodiment 6

The dual component lithium metal oxide powder, wherein $0.15 \leq x \leq 0.25$, $0.55 \leq y \leq 0.70$, and $0.05 \leq z \leq 0.15$.

Embodiment 7

The dual component lithium metal oxide powder wherein $x=0.22 \pm 0.02$, $y=0.67 \pm 0.05$, $z=0.11 \pm 0.05$ and $0.18 \leq b \leq 0.21$. In an embodiment $c=0.01 \pm 0.005$.

It is clear that further product embodiments according to the invention may be provided with features that are covered by the different product embodiments described before.

Viewed from a second aspect, the invention can provide the following method embodiments:

Embodiment 8

A method for preparing the dual component lithium-rich layered oxide positive electrode material according to one of the product embodiments, comprising the steps of:
- providing a precursor comprising Ni, Mn and Co,
- providing a precursor comprising Zr that is insoluble in water,
- providing a precursor comprising dopant A,
- providing a precursor comprising Li,
- preparing a dry mixture comprising the precursors of Ni, Mn and Co; lithium, Zr and A, wherein the amounts of the different elements are stoichiometrically controlled to reach a general formula $Li_{1+b}N_{1-b}O_2$, with $0.155 \leq b \leq 0.25$ and $N=Ni_xMn_yCo_zZr_cA_d$, with $0.10 \leq x \leq 0.40$, $0.30 \leq y \leq 0.80$, $0<z \leq 0.20$, $0.005 \leq c \leq 0.03$, and $0 \leq d \leq 0.10$, and wherein $x+y+z+c+d=1$,
- heating the mixture to a sintering temperature of at least 700° C.,
- sintering the mixture at the sintering temperature for a period of time,
- cooling the sintered mixture. In different embodiments, the sintering temperature is between 700 and 950° C., in particular between 800 and 850° C. These temperature ranges proved to be effective for achieving the desired product properties. In one embodiment, the period of time of the sintering step is between 5 and 15 hr, in particular around 10 hr. In another embodiment, the source of Ni, Mn and Co is a stoichiometrically controlled Ni—Mn—Co carbonate.

Embodiment 9

The method for preparing the dual component lithium-rich layered oxide positive electrode material wherein $0.205<b \leq 0.25$.

Embodiment 10

The method for preparing the dual component lithium-rich layered oxide positive electrode material, wherein step of providing a precursor comprising Ni, Mn and Co comprises the steps of:
- providing separate sources of Ni, Mn and Co, the sources being either one of nitrates, sulfates or oxalates,
- mixing stoichiometrically controlled quantities of the separate sources in a water-based liquid to reach a general formula $Ni_xMn_yCo_z$,
- adding a precipitation agent that is either a hydroxide or a carbonate, whereby the precursor, being a Ni—Mn—Co oxy-hydroxide or a Ni—Mn—Co carbonate is precipitated.

Embodiment 11

The method for preparing the dual component lithium-rich layered oxide positive electrode material, wherein the Zr precursor is $ZrO_2$.

Embodiment 12

The method for preparing the dual component lithium-rich layered oxide positive electrode material, wherein the Zr precursor is a sub-micron sized $ZrO_2$ powder having a D50<500 nm and a BET$\geq$40 $m^2/g$.

Embodiment 13

The method for preparing the dual component lithium-rich layered oxide positive electrode material, wherein the precursor of the dopant A is either one or more compounds selected from the group consisting of $Al_2O_3$, $TiO_2$, MgO, $WO_3$, $Cr_2O_3$, $V_2O_5$, $Nb_2O_5$ and $RuO_2$. In an embodiment the precursor comprising dopant A may be $Al_2O_3$. In that embodiment the source of A may further comprise either one or more compounds selected from the group consisting of $TiO_2$, MgO, $WO_3$, $Cr_2O_3$, $V_2O_5$, $Nb_2O_5$ and $RuO_2$.

It is clear that further method embodiments according to the invention may be provided with features that are covered by the different method embodiments described before.

Viewed from a third aspect, the invention can provide an electrochemical cell (such as a Li-ion battery) comprising a cathode material comprising the lithium-rich NMC powder according to the invention, wherein the electrochemical cell is used in either one of a portable electronic device, a portable computer, a tablet, a mobile phone, an electrically powered vehicle and an energy storage system.

DETAILED DESCRIPTION

The invention provides cathode material powders which have an improved cycle stability and voltage stability when charged up to 4.6V in coin cells. These materials are considered as lithium-rich NMC materials which have a solid-solution structure, that is a layered structure with space group of R3-m and with a certain amount of long-range Li ordering with a $\sqrt{3}a_{hex} \times \vec{3}c_{hex}$ superstructure in the transition-metal layer. These materials can provide a significantly higher specific capacity compared to existing commercial NMC cathode materials, for example NMC 111 (with Ni:Mn:Co=33:33:33). With improved voltage stability, the cathode materials according to the invention are promising candidates for a use in high end portable electronics, automotive applications, power tools and energy storage.

The authors discovered that lithium-rich NMC cathode powders with contain a certain amount of Zr doping, or Zr doping combined with other doping elements, have superior characteristics when used in Li-ion batteries. The doping with Zr can help suppressing the discharge voltage fading during cycling, therewith helping to solve the most challenging issue of practical application of lithium-rich NMC materials.

In accordance with the invention, the particles forming the powder of the invention have the general formula $Li_{1+b}N_{1-b}O_2$, with $0.155 \leq b \leq 0.25$, $N=Ni_xMn_yCo_zZr_cA_d$, $0.10 \leq x \leq 0.40$, $0.30 \leq y \leq 0.80$, $0 < z \leq 0.20$, $0.005 \leq c \leq 0.03$, and $0 \leq d \leq 0.10$, A being a dopant comprising at least one element selected from Al, Mg, Ti, Cr, V, W, Nb and Ru. In an embodiment, b is controlled by the Li/N ratio to be in a range of $0.205 < b \leq 0.25$ and the Zr amount is controlled to be in a range of $0.005 \leq c \leq 0.03$ or even $0.01 \leq c \leq 0.03$. In the material according to the invention, a large part of the Zr is homogenously doped into the crystal structure of the lithium-rich NMC powder, while a minor part of Zr is formed into $Li_2ZrO_3$ as a secondary phase that is homogeneously distributed in the matrix of $Li_{1+b}N_{1-b}O_2$ material, as can be seen from the XRD pattern and EDS mapping of Zr. In this embodiments, the voltage fading of lithium-rich NMC is significantly suppressed, compared to non-Zr doped materials.

The invention also provides a process as described in the summary. The first mixture is obtained by blending a source of lithium, sources of transition metal (Ni, Mn, Co), a source of Zr and (if applicable) a source of A. For the lithium and transitional metal sources, known materials are preferred. For example, lithium carbonate and a mixed Ni—Mn—Co oxy-hydroxide or a mixed Ni—Mn—Co carbonate. Then all the precursors are homogenously blended in a vertical single-shaft mixer by a dry powder mixing process. The blend ratio may be targeted to obtain the composition of the oxide powder.

The source of Zr may be a nanometric $ZrO_2$ powder. In one embodiment the $ZrO_2$ typically has a BET of at least 40 $m^2/g$ and consists of primary particles having a d50<500 nm, the primary particles being non-aggregated. In an embodiment of the inventive method, A is least one dopant. A can be one or more elements from the group of Al, Mg, Ti, Cr, V, W, Nb and Ru. The source of A may be a compound selected from a group of metal oxides, for example, $Al_2O_3$, $TiO_2$, MgO, $WO_3$, $Cr_2O_3$, $V_2O_5$, $Nb_2O_5$, $RuO_2$ and mixtures thereof.

In the inventive process, during the heating step, the mixture is heated to a temperature (referred to as sintering temperature) which is at least 600° C., preferably at least 700° C., and more preferably at least 750° C. Preferably, the sintering temperature is at most 950° C., more preferably at most 900° C., most preferably at most 850° C. The selection of this sintering temperature is important to obtain a homogeneous doping of the lithium-rich NMC materials. The sintering time is the period of heat treatment at the constant sintering temperature. The sintering time is preferably at least 5 hours, more preferably at least 8 hours. Preferably, the sintering time is less than 15 hours, more preferably less than 12 hours.

Figure 2:
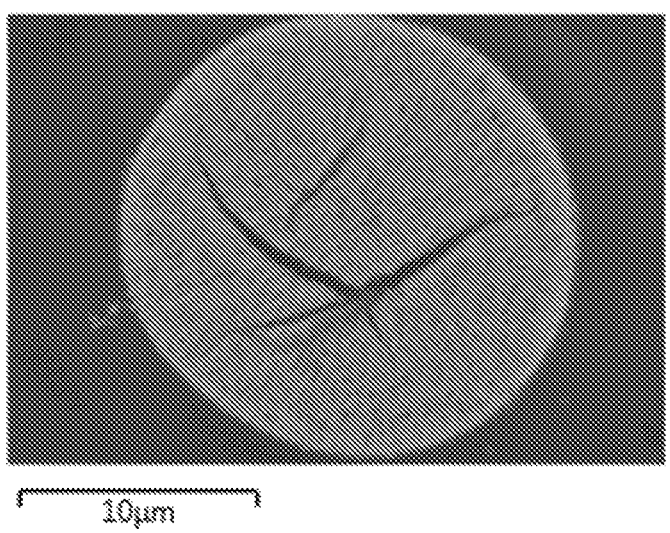
Figure 3:
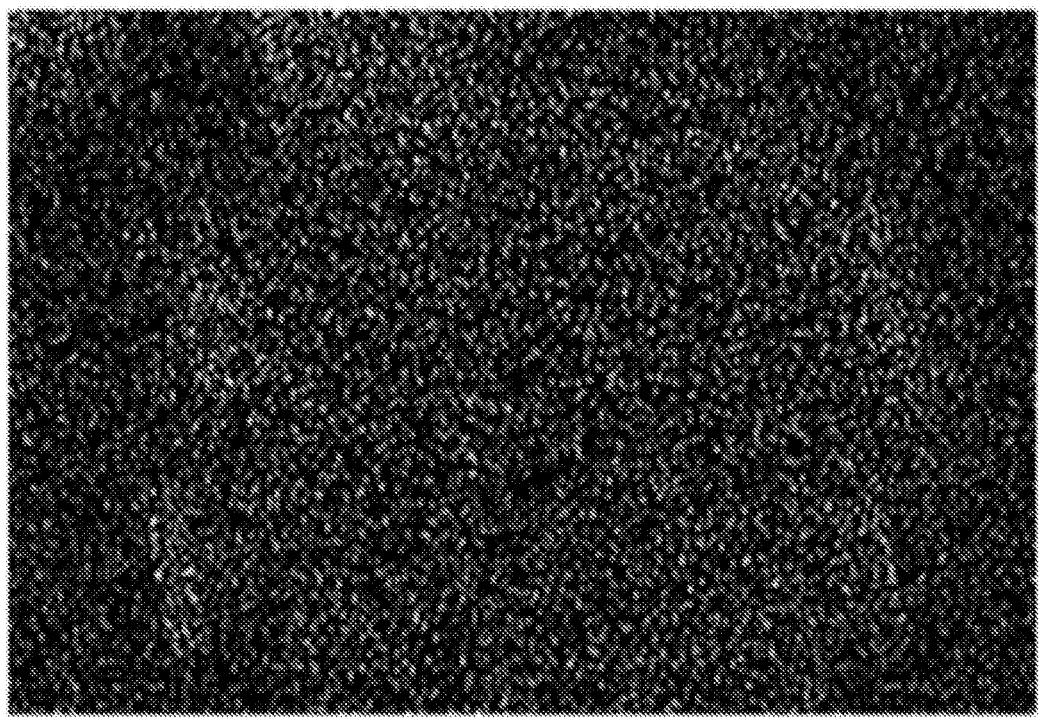

In order to explain the invention in more detail, the following examples and counter example are provided, which refer to the following figures:

FIG. 1: Relationship of Li/M versus Unit cell Volume measured from X-ray diffraction (XRD);

FIG. 2: Cross-sectional SEM image;

FIG. 3: EDS mapping of Zr in Example 4.

In order to evaluate the materials prepared according to the invention, they are submitted to the following Coin cell test: a half cell (coin cell) is assembled by placing a separator (from Celgard) between the positive electrode and a piece of lithium metal as negative electrode, and dropping an electrolyte—1M $LiPF_6$ in EC/DMC (1:2)—between separator and electrodes. All the cell tests in the Examples below follow the procedure shown in Table 1. The C-rate is defined as 160 mAh/g. For example, 0.1C means that the cell will be charged or discharged in 10 hours. "E-Curr" and "V" stand for the end current and cut-off voltage, respectively. At the first cycle, the DQ0.05C (discharge capacity of the first cycle at a rate of 0.05C) and IRRQ (irreversible capacity) are determined. The rate performance can be calculated from the subsequent six cycles. The performance of cycle stability is obtained from cycle #8 to #32. The capacity fading at 0.1C is represented by "$Q_{fade}0.1C$ (%/100)". With DQ8 and DQ31 referring to the discharge capacity of cycle #8 and #31 respectively, the "$Q_{fade}0.1C$ (%/100)" could be obtained through the following formula: (1−(DQ31/DQ8))/22*100*100. The performance of the discharge voltage stability is obtained from cycle #8 to #32. The voltage fading at 0.1C is represented by "$V_{fade}0.1C$ (V/100)". With DV8 and DV31 referring to the average discharge voltage of cycle #8 and #31 respectively, the "$V_{fade}0.1C$ (V/100 cycle)" could be obtained through the following formula: (DV8/DV31))/22*100.

TABLE 1 coin cell testing procedure

| Cycle # | Charge | | | Discharge | | |
|---|---|---|---|---|---|---|
| | C-rate | E-Curr | V | C-rate | E-Curr | V |
| 1 | 0.05 | — | 4.6 | 0.05 | — | 2.0 |
| 2 | 0.25 | 0.05 C | 4.6 | 0.10 | — | 2.0 |
| 3 | 0.25 | 0.05 C | 4.6 | 0.20 | — | 2.0 |
| 4 | 0.25 | 0.05 C | 4.6 | 0.50 | — | 2.0 |

TABLE 1-continued coin cell testing procedure

| Cycle # | Charge | | | Discharge | | |
|---|---|---|---|---|---|---|
| | C-rate | E-Curr | V | C-rate | E-Curr | V |
| 5 | 0.25 | 0.05 C | 4.6 | 1.00 | — | 2.0 |
| 6 | 0.25 | 0.05 C | 4.6 | 2.00 | — | 2.0 |
| 7 | 0.25 | 0.05 C | 4.6 | 3.00 | — | 2.0 |
| 8 | 0.25 | 0.05 C | 4.6 | 0.10 | — | 2.0 |
| 9 | 0.25 | 0.05 C | 4.6 | 1.00 | — | 2.0 |
| 10-30 | 0.25 | 0.05 C | 4.6 | 0.50 | — | 2.0 |
| 31 | 0.25 | 0.05 C | 4.6 | 0.10 | — | 2.0 |
| 32 | 0.25 | 0.05 C | 4.6 | 1.0 | — | 2.0 |

The materials according to this invention were measured in a commercial X-ray diffractometer to obtain crystal structural information. A Rigaku D/MAX 2200 PC diffractometer equipped with a Cu (K-Alpha) target X-ray tube and a diffracted beam monochromator at room temperature in the 15 to 70 2-Theta (θ) degree range was applied. The lattice parameters (a and c axis of the unit cell) of the different phases were calculated from the X-ray diffraction patterns using full pattern matching and Rietveld refinement methods. The volume of the unit cell of the examples was calculated by using the following equation:

$$V_{unit\ cell} = a^2 * c * \frac{\sqrt[2]{3}}{6}$$

The invention will now be illustrated in the following Examples:

Example 1

A powder according to the invention is manufactured by the following steps:

(a) Blending of lithium, Nickel-Manganese-Cobalt precursor and Zr precursor: lithium carbonate, a mixed Ni—Mn—Co carbonate and $ZrO_2$ are homogenously blended a vertical single-shaft mixer by a dry powder mixing process. The blend ratio is targeted to obtain $Li_{1.197}(Ni_{0.218}Mn_{0.663}Co_{0.109}Zr_{0.01})_{0.803}O_2$, which can be easily verified by an analysis technique such as ICP.

(b) Synthesizing in an oxidizing atmosphere: the powder mixture from step (a) is sintered in a box furnace in an oxidizing atmosphere. The sintering temperature is 800° C. and the dwell time is ~10 hrs. Dry air is used as an oxidizing gas.

(c) Milling: after sintering, the sample is milled in a grinding machine to a particle size distribution with D50=10-12 μm.

Example 2

A powder according to the invention is manufactured by the following steps:

(a) Blending of lithium, Nickel-Manganese-Cobalt precursor and Zr precursor: lithium carbonate, a mixed Ni—Mn—Co carbonate and $ZrO_2$ are homogenously blended a vertical single-shaft mixer by a dry powder mixing process. The blend ratio is targeted to obtain $Li_{1.201}(Ni_{0.218}Mn_{0.663}Co_{0.109}Zr_{0.01})_{0.799}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 800° C. and the dwell time is ~10 hrs. Dry air is used as an oxidizing gas.

(c) Milling: after sintering, the sample is milled in a grinding machine to a particle size distribution with D50=10-12 μm.

Example 3

A powder according to the invention is manufactured by the following steps:

(a) Blending of lithium, Nickel-Manganese-Cobalt precursor and Zr precursor: lithium carbonate, a mixed Ni—Mn—Co carbonate and $ZrO_2$ are homogenously blended a vertical single-shaft mixer by a dry powder mixing process. The blend ratio is targeted to obtain $Li_{1.203}(Ni_{0.218}Mn_{0.663}Co_{0.109}Zr_{0.01})_{0.797}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 850° C. and the dwell time is ~10 hrs. Dry air is used as an oxidizing gas.

(c) Milling: after sintering, the sample is milled in a grinding machine to a particle size distribution with D50=10-12 μm.

Example 4

A powder according to the invention is manufactured in by the following steps:

(a) Blending of lithium, Nickel-Manganese-Cobalt precursor and Zr precursor: lithium carbonate, a mixed Ni—Mn—Co carbonate and $ZrO_2$ are homogenously blended a vertical single-shaft mixer by a dry powder mixing process. The blend ratio is targeted to obtain $Li_{1.210}(Ni_{0.218}Mn_{0.663}Co_{0.109}Zr_{0.01})_{0.790}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 850° C. and the dwell time is ~10 hrs. Dry air is used as an oxidizing gas.

(c) Milling: after sintering, the sample is milled in a grinding machine to a particle size distribution with D50=10-12 μm.

Counter Example 1

A powder according to the invention is manufactured by the following steps:

(a) Blending of lithium and Nickel-Manganese-Cobalt precursor: lithium carbonate and a mixed Ni—Mn—Co carbonate are homogenously blended a vertical single-shaft mixer by a dry powder mixing process. The blend ratio is targeted to obtain $Li_{1.197}(Ni_{0.22}Mn_{0.67}Co_{0.11})_{0.803}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 800° C. and the dwell time is ~10 hrs. Dry air is used as an oxidizing gas.

(c) Milling: after sintering, the sample is milled in a grinding machine to a particle size distribution with D50=10-12 μm.

Counter Example 2

A powder according to the invention is manufactured by the following steps:

(a) Blending of lithium and Nickel-Manganese-Cobalt precursor: lithium carbonate and a mixed Ni—Mn—Co carbonate are homogenously blended a vertical single-shaft mixer by a dry powder mixing process. The blend ratio is targeted to obtain $Li_{1.201}(Ni_{0.22}Mn_{0.67}Co_{0.11})_{0.799}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 800° C. and the dwell time is ~10 hrs. Dry air is used as an oxidizing gas.

(c) Milling: after sintering, the sample is milled in a grinding machine to a particle size distribution with D50=10-12 μm.

Counter Example 3

A powder according to the invention is manufactured by the following steps:

(a) Blending of lithium and Nickel-Manganese-Cobalt precursor: lithium carbonate and a mixed Ni—Mn—Co carbonate are homogenously blended a vertical single-shaft mixer by a dry powder mixing process. The blend ratio is targeted to obtain $Li_{1.203}(Ni_{0.22}Mn_{0.67}Co_{0.11})_{0.797}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 850° C. and the dwell time is ~10 hrs. Dry air is used as an oxidizing gas.

(c) Milling: after sintering, the sample is milled in a grinding machine to a particle size distribution with D50=10-12 μm.

Counter Example 4

A powder according to the invention is manufactured by the following steps:

(a) Blending of lithium and Nickel-Manganese-Cobalt precursor: lithium carbonate and a mixed Ni—Mn—Co carbonate are homogenously blended a vertical single-shaft mixer by a dry powder mixing process. The blend ratio is targeted to obtain $Li_{1.20}(Ni_{0.22}Mn_{0.67}Co_{0.11})_{0.790}O_2$, which can be easily verified by an analysis technique such as ICP.

(b) Synthesizing in an oxidizing atmosphere: The powder mixture from step (a) is sintered in a box furnace in an oxidizing atmosphere. The sintering temperature is 850° C. and the dwell time is ~10 hrs. Dry air is used as an oxidizing gas.

(c) Milling: after sintering, the sample is milled in a grinding machine to a particle size distribution with D50=10-12 μm.

Discussion:

FIG. 1 shows the volume of the unit cell of the crystal structure of the different Examples and Counter Examples. Li/M is the target value calculated from the molecular formula of each example and counter example. The volume of the Examples and Counter Examples does not differ much, and follows the same trend versus the Li/M. Considering the similar ionic radii of $Zr^{4+}$ and $Ni^{2+}$ or $Co^{3+}$, $Zr^{4+}$ doping will not results in dramatic change of lattice constant and volume of the unit cell. This indicates that the Zr or most of it is doped into the crystal structure. The XRD pattern of the powder of Example 4 indicates the presence of the secondary phase $Li_2ZrO_3$. FIG. 2 shows the cross-sectional SEM images of Example 4 and FIG. 3 shows the EDS mapping of the element Zr. It shows that Zr element distributes homogenously in the NMC particle. It indicated that $Li_2ZrO_3$ also homogenously distributes in the bulk of obtained Li-rich NMC particles. Table 2 summarizes the coin cell performance of the Examples and Counter Examples. Example 1 shows an improved cycle stability versus Counter Example 1, with a comparable voltage stability. Example 2 shows a significant improvement in both cycle stability and voltage stability. Similar results are obtained when comparing Example 3 vs. Counter Example 3 and Example 4 vs. Counter Example 4. It is clear that the doped Zr improves the electrochemical performance of lithium-rich NMC, especially for the issue of voltage fading. Example 4 has the best voltage stability of all examples. It indicates that the presence of a secondary phase $Li_2ZrO_3$ homogenously distributed in the layered oxide could further improve the voltage stability. This may be due to the fact that $Li_2ZrO_3$ in the bulk could help to suppress the phase transition of layered structure to spinel structure. Meanwhile, Zr doping keeps the high energy density of this type of cathode materials.

TABLE 2

Comparison of cycle stability at different cycle conditions

| | $1^{st}$ DC Capacity (mAh/g) | $Q_{fade}$ 0.1 C (%) | $V_{fade}$ 0.1 C (V/100 cycle) |
|---|---|---|---|
| Example 1 | 280.87 | 16.12 | 0.305 |
| Counterexample 1 | 287.99 | 19.26 | 0.298 |
| Example 2 | 278.59 | 19.03 | 0.259 |
| Counterexample 2 | 291.25 | 23.02 | 0.305 |
| Example 3 | 278.16 | 12.47 | 0.222 |
| Counterexample 3 | 281.70 | 15.02 | 0.293 |
| Example 4 | 267.16 | 6.22 | 0.218 |
| Counterexample 4 | 271.13 | 20.18 | 0.269 |

The invention claimed is:

1. A dual component lithium-rich layered oxide positive electrode material for a secondary battery, the material comprising a single-phase lithium metal oxide component and a $Li_2ZrO_3$ component, wherein the single-phase lithium metal oxide component has a general formula $Li_{1+b}N_{1-b}O_2$, wherein $0.155 \leq b \leq 0.25$ and $N=Ni_xMn_yCo_zZr_cA_d$, wherein $0.10 \leq x \leq 0.40$, $0.30 \leq y \leq 0.80$, $0 < z \leq 0.20$, $0.005 \leq c \leq 0.03$, $0 \leq d \leq 0.10$, wherein $x+y+z+c+d=1$, with A being a dopant comprising at least one element, and wherein the $Li_2ZrO_3$ component is distributed in the layered oxide material.

2. The dual component lithium-rich layered oxide positive electrode material of claim 1, wherein $0.205 < b \leq 0.25$.

3. The dual component lithium-rich layered oxide positive electrode material of claim 2, wherein the $Li_2ZrO_3$ component is homogeneously distributed in the layered oxide material.

4. The dual component lithium-rich layered oxide positive electrode material of claim 1, wherein $0.15 \leq x \leq 0.30$, $0.50 \leq y \leq 0.75$, $0.05 < z \leq 0.15$, $0.01 \leq c \leq 0.03$, and $0 \leq d \leq 0.10$.

5. The dual component lithium metal oxide powder of claim 1, wherein the dopant A comprises one or more elements selected from the group consisting of Al, Mg, Ti, Cr, V, W, Nb and Ru.

6. The dual component lithium metal oxide powder of claim 1, wherein $0.15 \leq x \leq 0.25$, $0.55 \leq y \leq 0.70$, and $0.05 \leq z \leq 0.15$.

7. The dual component lithium metal oxide powder of claim 1, wherein $x=0.22\pm0.02$, $y=0.67\pm0.05$, $z=0.11\pm0.05$ and $0.18 \leq b \leq 0.21$.

8. A method for preparing the dual component lithium-rich layered oxide positive electrode material according to claim 1, comprising:
providing a precursor comprising Ni, Mn and Co,
providing a precursor comprising Zr that is insoluble in water,
providing a precursor comprising dopant A,
providing a precursor comprising Li,
preparing a dry mixture comprising the precursors of Ni, Mn and Co; lithium, Zr and A, wherein the amounts of the different elements are stoichiometrically controlled to reach a general formula $Li_{1+b}N_{1-b}O_2$, with $0.155 \leq b \leq 0.25$ and $N=Ni_xMn_yCo_zZr_cA_d$, with $0.10 \leq x \leq 0.40$, $0.30 \leq y \leq 0.80$, $0 < z \leq 0.20$, $0.005 \leq c \leq 0.03$, and $0 \leq d \leq 0.10$, and wherein $x+y+z+c+d=1$,
heating the mixture to a sintering temperature of at least 700° C.,
sintering the mixture at the sintering temperature for a period of time, and
cooling the sintered mixture.

9. The method according to claim 8, wherein $0.205 < b \leq 0.25$.

10. The method according to claim 8, wherein the step of providing a precursor comprising Ni, Mn and Co comprises:
providing separate sources of Ni, Mn and Co, the sources being one of nitrates, sulfates or oxalates,
mixing stoichiometrically controlled quantities of the separate sources in a water-based liquid to reach a general formula $Ni_xMn_yCo_z$,
adding a precipitation agent that is either a hydroxide or a carbonate, whereby the precursor, being a Ni—Mn—Co oxy-hydroxide or a Ni—Mn—Co carbonate is precipitated.

11. The method according to claim 8, wherein the Zr precursor is $ZrO_2$.

12. The method according to claim 8, wherein the Zr precursor is a sub-micron sized $ZrO_2$ powder having a $D50<500$ nm and a $BET \geq 40$ m²/g.

13. The method according to claim 8, wherein the precursor of the dopant A is one or more compounds selected from the group consisting of $Al_2O_3$, $TiO_2$, MgO, $WO_3$, $Cr_2O_3$, $V_2O_5$, $Nb_2O_5$ and $RuO_2$.

* * * * *